(12) United States Patent
Alekseev et al.

(10) Patent No.: US 11,407,645 B2
(45) Date of Patent: Aug. 9, 2022

(54) METHOD AND APPARATUS FOR PRODUCING CARBON DIOXIDE

(71) Applicant: LINDE AKTIENGESELLSCHAFT, Munich (DE)

(72) Inventors: Alexander Alekseev, Wolfratshausen (DE); Ramachandran Krish Krishnamurthy, Bridgewater, NJ (US); Stevan Jovanovic, North Plainfield, NJ (US)

(73) Assignee: LINDE AKTIENGESELLSCHAFT, Munich (DE)

(*) Notice: Subject to any disclaimer, the term of this patent is extended or adjusted under 35 U.S.C. 154(b) by 426 days.

(21) Appl. No.: 16/680,875

(22) Filed: Nov. 12, 2019

(65) Prior Publication Data

US 2020/0148542 A1 May 14, 2020

Related U.S. Application Data

(60) Provisional application No. 62/758,801, filed on Nov. 12, 2018.

(51) Int. Cl.
*C01B 32/50* (2017.01)
*F23J 15/02* (2006.01)

(52) U.S. Cl.
CPC ............... *C01B 32/50* (2017.08); *F23J 15/02* (2013.01); *F23J 2900/11002* (2013.01)

(58) Field of Classification Search
CPC .... F23J 2900/11002; F23J 15/02; F23K 5/00; F23K 5/002; F23K 5/005; F23K 5/007; F23K 2400/20; B01D 53/62; B01D 53/86; B01D 2256/22; B01D 2257/504; B01J 19/0013; B01J 19/24; B01J 2219/00159; B01J 2219/00186; F23D 2204/00; F23D 2205/00; F23C 13/04; F23C 1/00; F23N 1/00; F23N 2239/04; C01B 32/50

See application file for complete search history.

(56) References Cited

U.S. PATENT DOCUMENTS

| | | | | |
|---|---|---|---|---|
| 4,870,201 A * | 9/1989 | Ramachandran | ..... | C07C 253/24 558/319 |
| 5,797,737 A * | 8/1998 | Le Gal | ..... | F23C 6/047 431/170 |
| 6,669,916 B2 * | 12/2003 | Heim | ..... | B01D 53/04 95/146 |
| 8,728,202 B2 * | 5/2014 | Repasky | ..... | B01J 12/007 252/373 |
| 2007/0237710 A1 * | 10/2007 | Genkin | ..... | B01J 4/001 422/600 |

* cited by examiner

*Primary Examiner* — Timothy C Vanoy
(74) *Attorney, Agent, or Firm* — Millen White Zelano & Branigan, PC; Brion P. Heaney

(57) ABSTRACT

A method is provided for producing carbon dioxide by combusting a carbonaceous fuel with oxygen or with a gas mixture containing more than 25 mol % of oxygen obtaining a flue gas mixture, wherein the flue gas mixture is processed obtaining a secondary gas mixture containing carbon dioxide and oxygen, and wherein a part of the oxygen contained in the secondary gas mixture is catalytically reacted with a first auxiliary fuel in a reactor system comprising a series of multiple reactors, obtaining further carbon dioxide and water. A further part of the oxygen contained in the secondary gas mixture is catalytically reacted with a second auxiliary fuel in the reactor system. A corresponding apparatus is also described herein.

21 Claims, 3 Drawing Sheets

METHOD AND APPARATUS FOR PRODUCING CARBON DIOXIDE

BACKGROUND OF THE INVENTION

The present invention relates to a method for producing carbon dioxide comprising combusting a carbonaceous fuel with oxygen or with a gas mixture containing more than 25 mol % of oxygen, and to a corresponding apparatus according to the preambles of the independent claims.

Capturing carbon dioxide from combustion flue gases is known. As e.g. outlined in the article "Carbon Dioxide" in Ullmann's Encyclopedia of Industrial Chemistry, online publication 30 May 2014, doi: 10.1002/14356007.a05_165.pub2, section 6.2, "Carbon Dioxide from Flue Gases," carbon dioxide is a component of all flue gases produced by the complete combustion of carbonaceous fuels. Carbon dioxide concentrations in such gases are typically in the range of 10 to 18 mol %. They can be higher when a so-called oxygen-enriched combustion is performed.

In oxygen-enriched combustion or so-called oxyfuel processes, ambient air which is normally used for combustion is substituted by oxygen-enriched air or pure oxygen. By using this approach, the content of nitrogen in the flue gas is correspondingly reduced. In oxyfuel processes, in order to regulate the temperature of the flame, most of the flue gas is fed back into the furnace. The essential advantages of oxyfuel processes are a lower flue gas volume because no nitrogen is present, and a higher combustion efficiency thanks to the high temperature of the combustion. In addition, carbon dioxide generated by an oxyfuel process is relatively pure and can be more easily separated from steam also contained in the flue gas by means of simple cooling.

While in oxyfuel power generation systems a significant fraction of contained water vapour in the flue gas can, as mentioned, be condensed out simply by cooling the flue gas stream below the dew point temperature at operating pressure, and most of remaining traces of sulphur and nitrogen oxide impurities can be removed with appropriate chemical treatments within wash towers, the resulting flue gas still contains oxygen, typically in the range of 3 mol % to 10 mol %. Such oxygen can be removed by utilizing catalytic deoxidation systems wherein the released heat of reaction can be then integrated with the power generation cycle, leading to an increased power generation efficiency.

The object of the present invention is to further improve the production of carbon dioxide in corresponding processes including catalytic deoxidation.

SUMMARY OF THE INVENTION

According to the present invention, a method for producing carbon dioxide comprising combusting a carbonaceous fuel with oxygen or with gas mixture containing more than 25 mol % of oxygen, and a corresponding apparatus with the features of the independent claims are provided. Preferred embodiments are the subject of the dependent claims and of the description that follows.

As mentioned before, oxygen in a flue gas from oxygen enriched combustion, i.e. from an oxyfuel process, can be removed by catalytic deoxidation systems. Appropriate catalysts, along with supplemental fuels, such as hydrogen or natural gas, can efficiently promote deoxidation reactions. Typical reactions in corresponding deoxidation systems include:

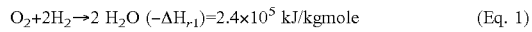

(Eq. 1)

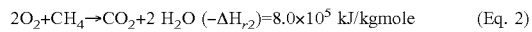

(Eq. 2)

The heat generated by the methane based deoxidation reaction (Eq. 2) is more than three times higher as compared to the hydrogen based deoxidation reaction (Eq. 1). As also known, the minimum ignition temperature of hydrogen (typically at ca. 100° C.) is significantly lower than that of methane (typically at ca. 400° C.).

The maximum allowable temperature of noble catalysts used for the catalytic deoxidation is typically lower than 600° C. The maximum permissible temperature of most cost efficient equipment construction materials (such as stainless steel) is also typically lower than 600° C. In both cases, margins of safety apply, resulting in practical maximum values of ca. 550° C.

Also in view of these restrictions, hydrogen as a supplemental fuel can reduce significantly higher levels of oxygen in a single pass through an adiabatic catalyst bed, i.e. a catalyst bed without temperature control means. For example, with an imposed maximum effluent temperature from a corresponding reactor of 550° C. it is, with methane as a fuel, possible to remove ca. 1.9 mol % of oxygen from carbon dioxide per pass, while hydrogen can oxidize ca. 4.3 mol % of oxygen per pass.

One of the solutions to eliminate a restricted oxygen conversion per pass is to utilize an isothermal deoxidation reactor, i.e. a reactor wherein the catalyst bed comprises temperature control means. Such a reactor is typically designed with a spiral wound heat exchanger immersed in the catalytic bed. However, there are a couple of significant challenges in implementing isothermal deoxidation reactors with oxygen concentrations significantly exceeding trace (ppm) levels of oxygen which are typically found in commercially practised deoxidation applications for helium or similar gases.

First, an isothermal reactor is significantly more expensive than an adiabatic reactor due to the additional constructional effort. Secondly, unless an accurate kinetic model for all individual catalytic reactions of multicomponent fuel mixtures (such as natural gas, for example) are known, controlling the desired temperature of the isothermal reactor becomes a serious challenge which can be further linked with safety issues with runaway reactions and unsafe temperature conditions inside the reactor.

An alternative solution is to utilise a multistage quasi-isothermal reactor with inter-stage coolers. In such an arrangement, the individual reactor stages are adiabatic. The temperature rise across each of the individual stages is maintained within allowable limits by controlling the amount of fuel injected into the flue gas at the inlet of each of adiabatic stages. This can be accomplished with any of the readily available hydrocarbons. However, when the minimum ignition temperature for the catalytic reaction is relatively high for a selected fuel (such as in case of natural gas, see above), it is necessary to use large number of reactor/intercooler stages which significantly increases capital cost of the system To overcome the problems mentioned above, according to the present invention, a corresponding deoxidation reactor system comprising a series of adiabatic reactors, as just explained, is operated with two different fuels instead of a single fuel as in the prior art. These fuels, termed "auxiliary fuels" in the following, are selected such that a first auxiliary fuel has a low ignition temperature (such as hydrogen) while a second auxiliary fuel has a high heat of reaction (such as natural gas).

This dual fuel option significantly reduces capital cost while increasing recovered energy when used within a multistage deoxidation reactor system with multiple interstage coolers and multiport fuel injections, as described in detail below.

According to the present invention, a method for producing carbon dioxide comprising combusting a carbonaceous fuel with oxygen or with a gas mixture containing more than 25 mol % of oxygen obtaining a flue gas mixture is provided. The present invention is therefore used in the context of an oxygen-enriched combustion or an oxyfuel process. The oxygen or the gas mixture containing more than 25 mol % of oxygen may be air enriched in oxygen or may be (substantially) pure oxygen. Its oxygen content can be, in the context of the present invention, at least 30, at least 35, at least 40, at least 50, at least 60, at least 70, at least 80, at least 90, at least 95 or at least 99%. The gas or a gas mixture can be e.g. provided by means of cryogenic air separation.

According to the present invention, the flue gas mixture is processed, e.g. by removing particles, by condensing and/or otherwise separating off steam, and by removing impurities like sulphur or nitrogen oxides by known means, obtaining a secondary gas mixture containing carbon dioxide and oxygen, particularly consisting of or essentially consisting of carbon dioxide and oxygen. The content of carbon dioxide and oxygen in the secondary gas mixture may be at least 90%, 95% or 99%. The secondary gas mixture may particularly contain 3 mol % to 10 mol % of oxygen and, in the remaining part, at least 90%, 95% or 99% of carbon dioxide.

In the present invention, a part of the oxygen contained in the secondary gas mixture is catalytically reacted with a first auxiliary fuel in a reactor system comprising a series of multiple reactors obtaining further carbon dioxide and water. As to further details, reference is made to the explanations above. Particularly, the secondary gas mixture is passed, under reduction of its oxygen content, through the series of multiple reactors one after another, and effluents of the reactors are, prior to being passed into the next reactor, cooled by intercoolers. The reactors are particularly adiabatic reactors, i.e. they do not comprise temperature control means in their catalytic beds.

While, in prior art methods of the kind mentioned, one auxiliary fuel is used in such reactor series, the present invention is characterized in that a further part of the oxygen contained in the secondary gas mixture is catalytically reacted with a second auxiliary fuel in the reactor system. This allows for the advantages of the present invention already referred to above to be obtained.

Particularly, a lower temperature at the entry to a reactor can be present because at this position a first auxiliary fuel with a lower minimum ignition temperature like hydrogen can be used and ignited there, notwithstanding the lower temperature present. Downstream thereof, where temperatures are significantly higher due to the reactions with the first auxiliary fuel, an auxiliary fuel with a higher minimum ignition temperature like natural gas can be used and the higher reaction heat of oxygen with this second auxiliary fuel can be profited from. The combination of the different fuels is therefore particularly advantageous because a sufficient cooling can be provided, protecting the catalyst and the reactor materials and allowing for an improved heat recovery, because the first auxiliary fuel with a lower minimum ignition temperature like hydrogen is used here. However, the proportion of oxygen catalytically removed is not limited to the lower amount of heat obtainable by the first auxiliary fuel because the second auxiliary fuel is also used. Due to the higher reaction temperature with the second auxiliary fuel, a higher value of recovered heat can be obtained. A runaway or excessive heating in a reactor system can be avoided by limiting the amount of fuel injected upstream of each adiabatic reactor.

For the reasons just mentioned, the first auxiliary fuel advantageously comprises a lower minimum ignition temperature than the second auxiliary fuel, and further advantageously the first auxiliary fuel and the second auxiliary fuel are selected such that an amount of heat generated by the catalytic reaction of an amount of oxygen with a stoichiometric amount of the first auxiliary fuel is lower than an amount of heat generated by the catalytic reaction of the amount of oxygen with a stoichiometric amount of the second auxiliary fuel. Furthermore, the first auxiliary fuel and the second auxiliary fuel are advantageously selected such that the second auxiliary fuel has a higher oxygen conversion efficiency than the first auxiliary fuel.

In the present invention, the first auxiliary fuel is advantageously a non-carbonaceous fuel and/or the second auxiliary fuel is advantageously a carbonaceous fuel. Particularly, the first auxiliary fuel advantageously consists of or predominantly comprises hydrogen, particularly in a content of more than 80 mol %, 90 mol %, 95 mol % or 99 mol %. Particularly, the second auxiliary fuel consists of or predominantly comprises, in the contents just explained for hydrogen in the first auxiliary fuel, gaseous hydrocarbons. Particularly, it can be natural gas.

According to one embodiment of the present invention, the first and the second auxiliary fuels are mixed obtaining an auxiliary fuel mixture, and parts of the auxiliary fuel mixture are supplied, separately to each other, into at least two of the multiple reactors. This corresponds to the embodiment also shown in FIG. 1 of the present invention. In this embodiment, a dual fuel injection system is substantially simplified but it requires robust and sophisticated control system to maintain a desired temperature profile within each of the catalyst beds.

According to the embodiment of the present invention just explained, a reactor effluent from at least one of the multiple reactors is at least partially cooled and supplied to a different one of the multiple reactors. In these a part of the auxiliary fuel mixture is admixed to the reactor effluent which is at least partially cooled and supplied the different one of the multiple reactors. This can also be the case for a series of reactors wherein to each of the effluents parts of the auxiliary fuel mixture are admixed.

In alternative embodiments of the present invention, the first auxiliary fuel or parts of the first auxiliary fuel is or are supplied, separately from the second auxiliary fuel, to at least two of the multiple reactors and parts of the second auxiliary fuel are supplied, separately from the first auxiliary fuel, to at least two of the multiple reactors. In contrast to the embodiment explained before, separate pipelines and dosage systems for the first and the second auxiliary fuel need to be provided. However, the overall control system may be substantially less sophisticated as the individual reactor temperatures can be controlled more easily by dosing the first and second auxiliary fuel.

In these embodiments, a reactor effluent from at least one of the multiple reactors is at least partially cooled and supplied to a different one of the multiple reactors, wherein a part of the first auxiliary fuel is admixed to the reactor effluent which is at least partially cooled and supplied the different one of the multiple reactors. Also this can relate to a series of corresponding reactors wherein to each or at least some of the effluents supplied to a subsequent reactor, parts of the first auxiliary fuel are admixed.

Particularly, in such an embodiment, a reactor effluent from a first one of the multiple reactors is at least partially cooled and supplied to a second one of the multiple reactors, a reactor effluent from the second one of the multiple reactors is at least partially cooled and supplied to a third one of the multiple reactors, and the first auxiliary fuel is admixed to a feed to the first of the multiple reactors. Also the first in a series of multiple reactors can thus be supplied with the first auxiliary fuel.

In a particularly advantageous implementation of such an embodiment, parts of the second auxiliary fuel are supplied to the first, the second and the third of the multiple reactors by directly injecting the parts into catalytic beds of these reactors. These parts are thus injected at a position where the temperature is sufficiently high for their ignition as compared to a reactor inlet.

A corresponding embodiment guarantees for a controlled temperature rise in the first part of each catalytic bed by injecting a predetermined amount of first auxiliary fuel with a low ignition temperature, e.g. hydrogen, to rise the temperature to the minimum ignition temperature of the second auxiliary fuel. Injection of the secondary fuel further increases the temperature of the effluent from each stage to desired value (close to the maximum allowable temperature for the catalyst and or material of reactor construction). Even an interstage cooler system in this context can be separated into two subsystem with a higher and a lower temperature of recovered heat of reactions, in order to optimize heat integration between the deoxidation subsystem and an associated power generation system.

In a further implementation of such an embodiment, a reactor effluent from the third one of the multiple reactors is at least partially cooled and supplied to a fourth one of the multiple reactors, the first auxiliary fuel is admixed to the first of the multiple reactors, a part of the second auxiliary fuel is directly supplied to the first of the multiple reactors. In this context, further parts of the second auxiliary fuel are admixed to the reactor effluent from the first one of the multiple reactors which is at least partially cooled and supplied to the second one of the multiple reactors, to the reactor effluent from the second one of the multiple reactors which is at least partially cooled and supplied to the third one of the multiple reactors, and to the reactor effluent from the third one of the multiple reactors which is at least partially cooled and supplied to a fourth one of the multiple reactors. In this implementation, the second auxiliary fuel or a corresponding part is particularly directly injected only into the catalytic bed of the first, but not of the subsequent ones of the multiple reactors.

This configuration further increases power generation efficiency with a moderately increased number of required stages and interstage coolers by the virtue that first auxiliary fuel is injected only into the first stage to initiate catalytic conversion of oxygen at a low temperature while the second auxiliary fuel with a higher heat of reaction guarantees for a higher value of recovered heat of reaction at temperatures between the maximum allowable temperature and the minimum ignition temperature of the second auxiliary fuel.

The present invention also relates to an apparatus for producing carbon dioxide adapted for combusting a carbonaceous fuel with a gas or a gas mixture containing more than 25 mol % of oxygen obtaining a flue gas mixture, wherein means are provided which are adapted to process the flue gas mixture obtaining a secondary gas mixture containing carbon dioxide and oxygen, and wherein means are provided which are adapted to catalytically react a part of the oxygen contained in the secondary gas mixture with a first auxiliary fuel in a reactor system comprising a series of multiple reactors, obtaining further carbon dioxide and water.

According to the invention, means are provided which are adapted to catalytically react a further part of the oxygen contained in the secondary gas mixture with a second auxiliary fuel in the reactor system.

As to further features and advantages of a corresponding apparatus, explicit reference is made to the explanations above.

This also relates to a corresponding apparatus comprising means adapted to perform a method as previously explained in detail.

The present invention and their specific embodiments will be further described with reference to the appended drawings.

In the figures, reference is made to apparatus according to embodiments of the present invention. These explanations likewise relate to corresponding methods. If, therefore, reference is made to apparatus or components thereof, the corresponding explanations also relate to method steps and vice versa.

DETAILED DESCRIPTION OF THE INVENTION

Figure 1:
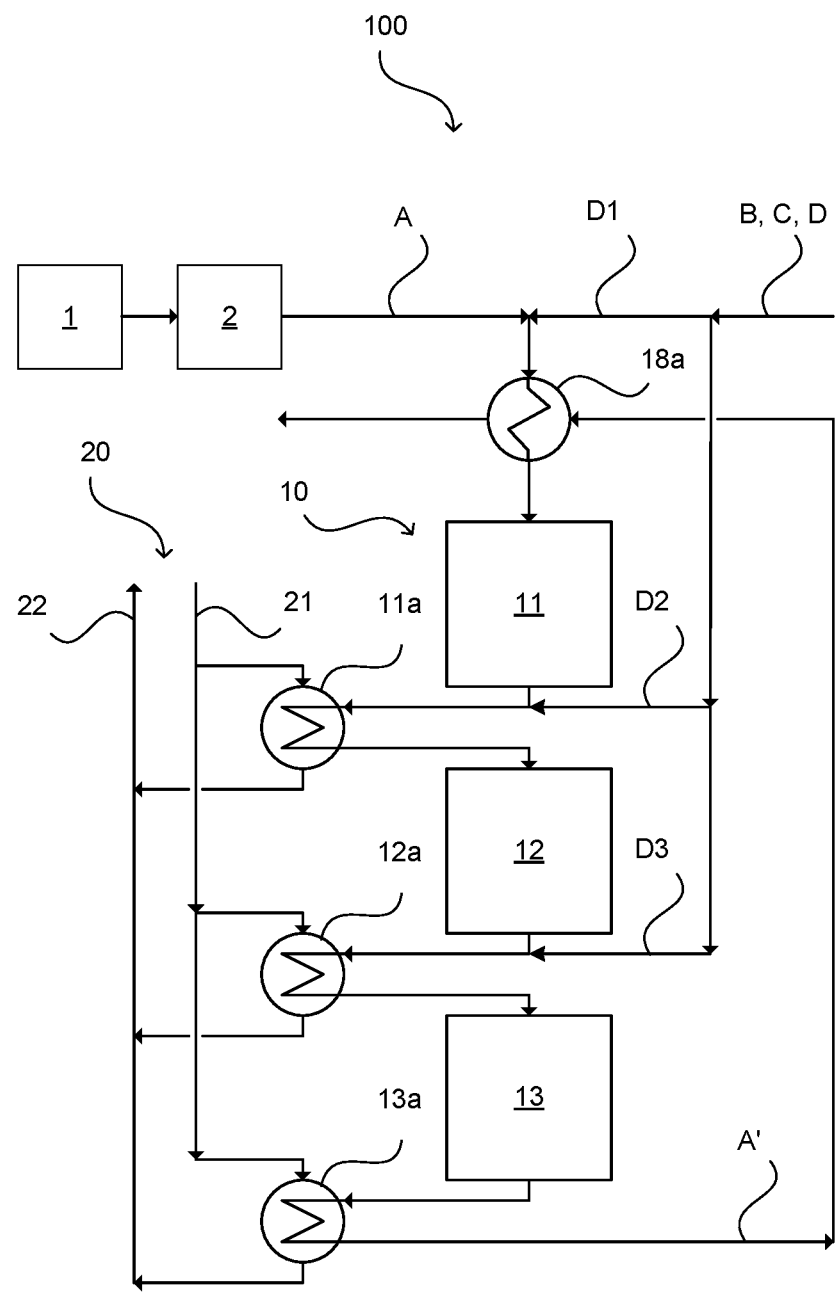
FIG. 1 illustrates an apparatus according to an embodiment of the invention.
Figure 2:
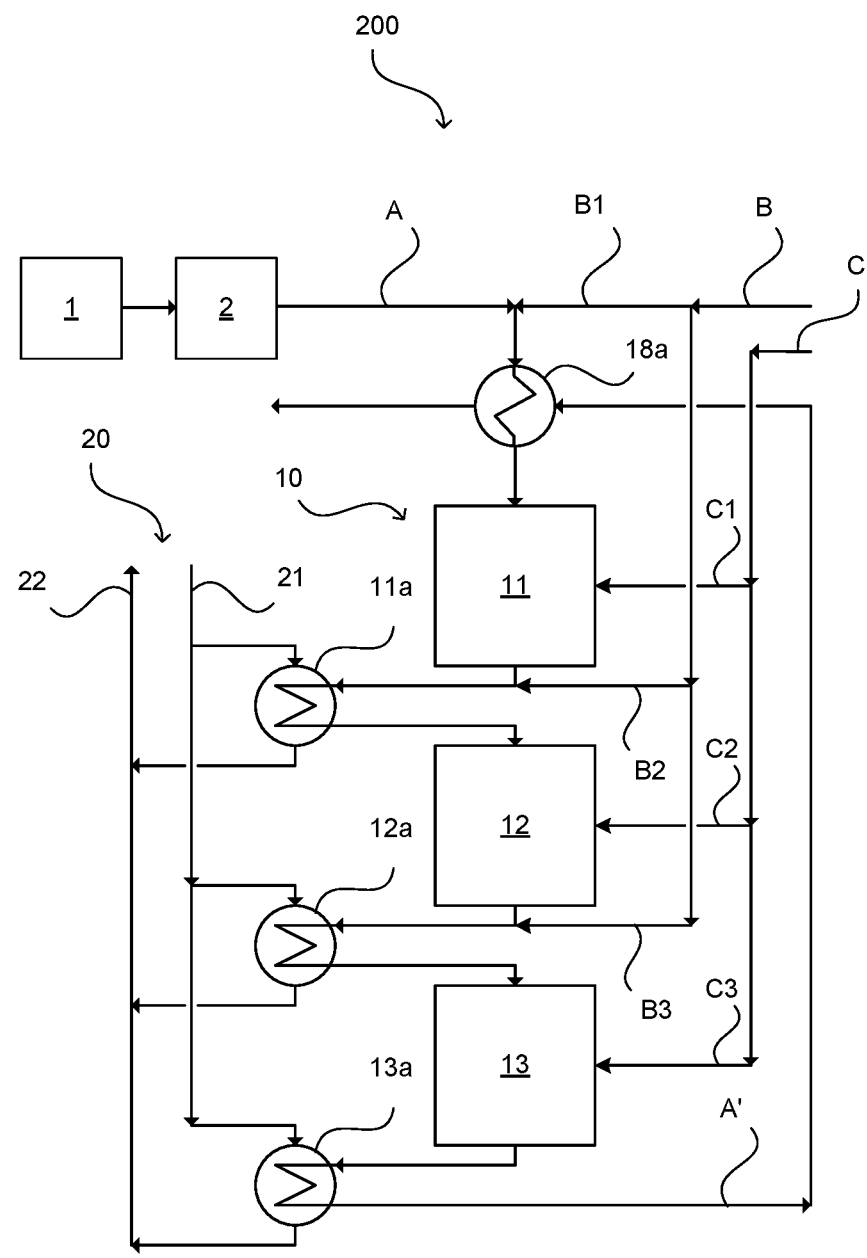
FIG. 2 illustrates an apparatus according to an embodiment of the invention.
Figure 3:
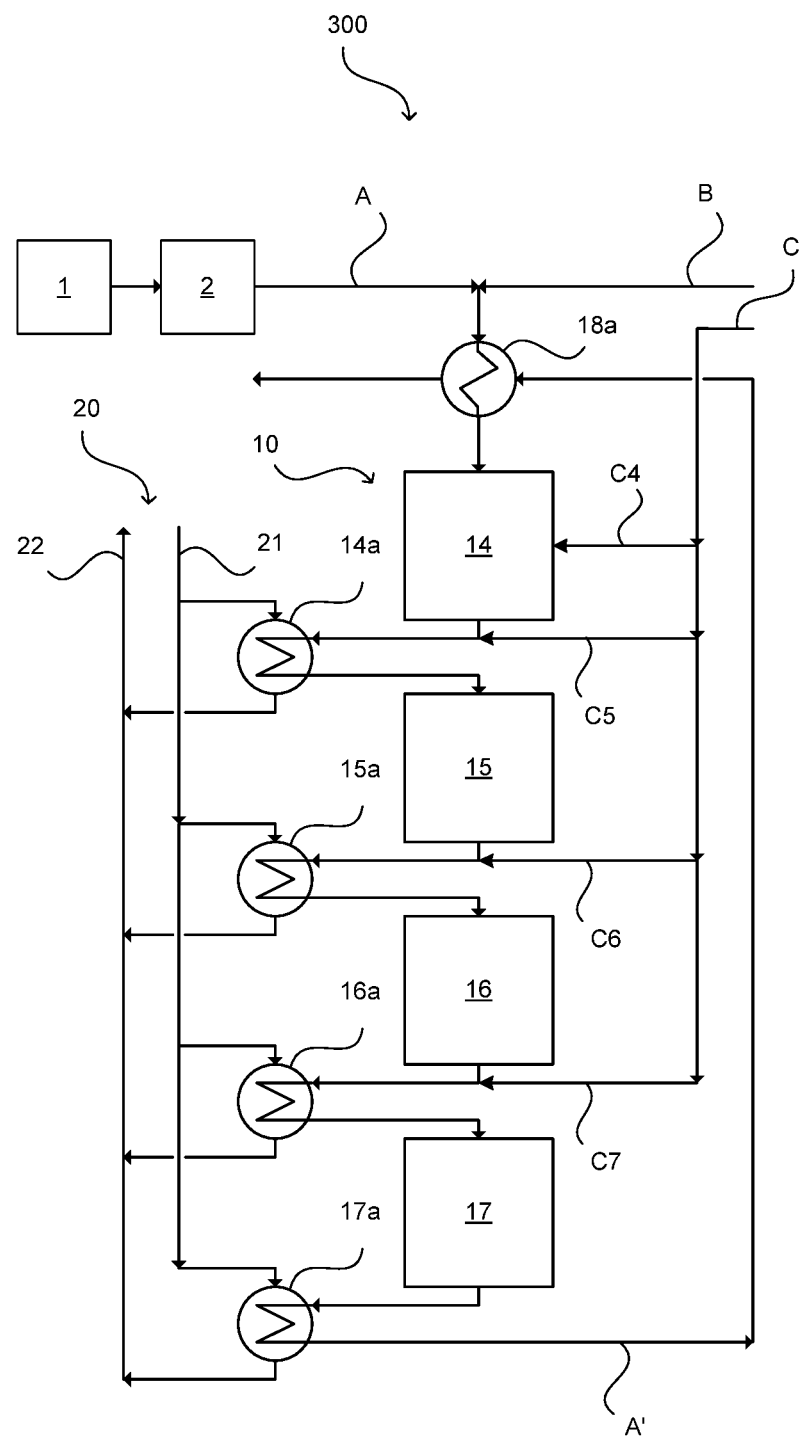
FIG. 3 illustrates an apparatus according to an embodiment of the invention.

In FIGS. 1 to 3, apparatus according to preferred embodiments of the present invention are explained. In all cases, a gas mixture A, termed "secondary gas mixture" herein, is provided by an oxygen-enriched combustion or an oxyfuel process 1 and corresponding processing steps 2. Further details as to the oxyfuel process 1 and processing steps 2 were explained above and are not recited or shown in detail here for reasons of conciseness.

In all cases, the secondary gas mixture A, containing carbon dioxide and oxygen, and particularly consisting of these components, is supplied to a reactor system 10, and in the reactor system 10 parts of the oxygen contained in the secondary gas mixture A are catalytically reacted with a first auxiliary fuel B, particularly hydrogen, and a second auxiliary fuel C, particularly natural gas, in a series of multiple reactors 11 to 17 in the reactor system 10, obtaining further carbon dioxide and water. In all cases, a reactor effluent from each of the reactors 11 to 17, save from a last one 13, 17 in each series, is at least partially cooled in a intercooler 11a, 12a, 14a, 15a, 16a and supplied to the subsequent reactor 12, 13, 15, 16, 17 in the series. Also the reactor effluent from the last reactor 13, 17 in each series is cooled in a corresponding cooler 13a, 17a. The coolers 11a to 17a are part of a heat recovery system 20 further including a heat exchanger 18a heating the feed to the reactor system 10 with gas mixture A' resulting from processing the secondary gas mixture A.

In the apparatus 100 as shown in FIG. 1, the first and the second auxiliary fuels B, C are mixed obtaining an auxiliary fuel mixture D, and parts D1, D2, D3 of the auxiliary fuel mixture D are supplied, separately to each other, into the reactors 11, 12, 13. More specifically, reactor effluents from the reactors 11, 12 are at least partially cooled and supplied to a next reactor 12, 13 and a part D2, D3 of the auxiliary fuel D mixture is admixed to the reactor effluent which is at least partially cooled and supplied the next reactor 12, 13, respectively. The part D1 is supplied to the reactor 11 and is mixed with the secondary gas mixture A before this is heated in the heat exchanger 18a. A cooling liquid feed is designated 21, a cooling liquid reflux is designated 22. The cooling liquid can be e.g. cooling water.

In the apparatus 200 as shown in FIG. 2, in contrast, parts B1, B2, B3 of the first auxiliary fuel B are supplied, separately from the second auxiliary fuel C, to at least the reactors 11, 12, 13, and parts C1, C2, C3 of the second auxiliary fuel C are supplied, separately from the first auxiliary fuel B, to the reactors 11, 12, 13. A reactor effluent from the reactors 11, 12 is at least partially cooled and supplied to a next one 12, 13 of the reactors 11 to 13, respectively. A part B2, B3 of the first auxiliary fuel B is respectively admixed to the reactor effluents, and a further part B1 is supplied to the reactor 11. Parts C1, C2, C3 of the second auxiliary fuel C are supplied to the reactors 11, 12, 13 by directly injecting these parts C1, C2, C3 into catalytic beds of these reactors 11, 12, 13.

In the apparatus 300 as shown in FIG. 3, in contrast to the apparatus 200 as shown in FIG. 2, a corresponding injection of second auxiliary fuel C is only made into the reactor 14 in form of a part C4, while other parts C5, C6, C7 are added to the respective reactor effluent. The first auxiliary fuel B is only supplied to the reactor 14.

Without further elaboration, it is believed that one skilled in the art can, using the preceding description, utilize the present invention to its fullest extent. The preceding preferred specific embodiments are, therefore, to be construed as merely illustrative, and not limitative of the remainder of the disclosure in any way whatsoever.

In the foregoing and in the examples, all temperatures are set forth uncorrected in degrees Celsius and, all parts and percentages are by weight, unless otherwise indicated.

The entire disclosures of all applications, patents and publications, cited herein and of corresponding U.S. Provisional Application Ser. No. 62/758,801, filed Nov. 12, 2018, are incorporated by reference herein.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What we claim is:

1. A method for producing carbon dioxide comprising:
   combusting a carbonaceous fuel with oxygen or with a gas mixture containing more than 25 mol % of oxygen to obtain a flue gas mixture,
   processing the flue gas mixture to obtain a secondary gas mixture, wherein the secondary gas mixture contains carbon dioxide and oxygen,
   catalytically reacting a part of the oxygen contained in the secondary gas mixture with a first auxiliary fuel in a reactor system comprising a series of multiple reactors, obtaining further carbon dioxide and water, and
   catalytically reacting a further part of the oxygen contained in the secondary gas mixture with a second auxiliary fuel in the reactor system.

2. The method according to claim 1, wherein the first auxiliary fuel has a lower minimum ignition temperature than the second auxiliary fuel.

3. The method according to claim 1, wherein an amount of heat generated by catalytic reaction of an amount of oxygen with a stoichiometric amount of the first auxiliary fuel is lower than an amount of heat generated by catalytic reaction of an amount of oxygen with a stoichiometric amount of the second auxiliary fuel.

4. The method according to claim 1, wherein the first auxiliary fuel is a non-carbonaceous fuel and/or wherein the second auxiliary fuel is a carbonaceous fuel.

5. The method according to claim 4, wherein the first auxiliary fuel consists of or predominantly comprises hydrogen.

6. The method according to claim 4, wherein the second auxiliary fuel consists of or predominantly comprises gaseous hydrocarbons.

7. The method according to claim 4, wherein the first auxiliary fuel is a non-carbonaceous fuel and the second auxiliary fuel is a carbonaceous fuel.

8. The method according to claim 4, wherein the first auxiliary fuel has a hydrogen content of more than 80 mol %.

9. The method according to claim 4, wherein the second auxiliary fuel has a gaseous hydrocarbons content of more than 80 mol %.

10. The method according to claim 1, wherein the first and the second auxiliary fuels are mixed to obtain an auxiliary fuel mixture, and wherein parts of the auxiliary fuel mixture are separately supplied into at least two of the multiple reactors.

11. The method according to claim 10, wherein a reactor effluent from at least one of the multiple reactors is at least partially cooled and supplied to a different one of the multiple reactors, wherein a part of the auxiliary fuel mixture is admixed to the reactor effluent which is at least partially cooled and supplied to the different one of the multiple reactors.

12. The method according to claim 1, wherein the first auxiliary fuel or parts of the first auxiliary fuel is or are supplied, separately from the second auxiliary fuel, to at least two of the multiple reactors, and wherein parts of the second auxiliary fuel are supplied, separately from the first auxiliary fuel, to at least two of the multiple reactors.

13. The method according to claim 12, wherein a reactor effluent from at least one of the multiple reactors is at least partially cooled and supplied to a different one of the multiple reactors, wherein a part of the first auxiliary fuel is admixed to the reactor effluent which is at least partially cooled and supplied the different one of the multiple reactors.

14. The method according to claim 12, wherein a reactor effluent from a first one of the multiple reactors is at least partially cooled and supplied to a second one of the multiple reactors, wherein a reactor effluent from the second one of the multiple reactors is at least partially cooled and supplied to a third one of the multiple reactors, and wherein the first auxiliary fuel is admixed to a feed to the first of the multiple reactors.

15. The method according to claim 14, wherein parts of the second auxiliary fuel are supplied to the first, the second and the third of the multiple reactors by directly injecting the parts into catalytic beds of these reactors.

16. The method according to claim 14, wherein a reactor effluent from the third one of the multiple reactors is at least partially cooled and supplied to a fourth one of the multiple reactors, wherein the first auxiliary fuel is admixed to the first of the multiple reactors, wherein a part of the second auxiliary fuel is directly supplied to the first of the multiple reactors, and wherein further parts of the second auxiliary fuel are admixed to the reactor effluent from the first one of the multiple reactors which is at least partially cooled and supplied to the second one of the multiple reactors, to the reactor effluent from the second one of the multiple reactors which is at least partially cooled and supplied to the third one of the multiple reactors, and to the reactor effluent from the third one of the multiple reactors which is at least partially cooled and supplied to a fourth one of the multiple reactors.

17. The method according to claim 1, wherein the second auxiliary fuel has a higher oxygen conversion efficiency than the first auxiliary fuel.

18. The method according to claim 1, wherein
the first auxiliary fuel is admixed with the secondary gas mixture and the resultant admixture is sent to a first one of the multiple reactors,
a reactor effluent from said first one of the multiple reactors is at least partially cooled and supplied to a second one of the multiple reactors,
a reactor effluent from the second one of the multiple reactors is at least partially cooled and supplied to a third one of the multiple reactors, and
parts of the second auxiliary fuel are supplied to the first, second, and third of the multiple reactors.

19. The method according to claim 1, wherein the secondary gas mixture is heated by heat exchanger with the effluent discharged from a last one of the multiple reactors and then the secondary gas mixture is introduced into a first one of the multiple reactors.

20. An apparatus for producing carbon dioxide comprising:
means for combusting a carbonaceous fuel with oxygen or with a gas mixture containing more than 25 mol % of oxygen obtaining a flue gas mixture,
means for processing the flue gas mixture to obtain a secondary gas mixture containing carbon dioxide and oxygen,
a reactor system comprising a series of multiple reactors to catalytically react a part of the oxygen contained in the secondary gas mixture with a first auxiliary fuel to obtain further carbon dioxide and water, and
means for introducing a second auxillary fuel into the reactor system a to catalytically react a further part of the oxygen contained in the secondary gas mixture with the second auxiliary fuel.

21. The apparatus according to claim 20, wherein
the means for combusting carbonaceous fuel comprises a furnace,
the means for processing the flue gas mixture comprises a wash tower to remove sulphur and nitrogen oxide impurities, and
the means for introducing the second auxiliary fuel into the reactor system comprises one or more feed pipes for combining the second auxiliary fuel with one or more of the effluents from the multiple reactors in series.

\* \* \* \* \*